J. E. HIBBERT & C. L. HUNTLEY.
SAW TOOTH CENTERING INDICATOR.
APPLICATION FILED FEB. 20, 1912.
1,044,784.
Patented Nov. 19, 1912.
3 SHEETS—SHEET 1.
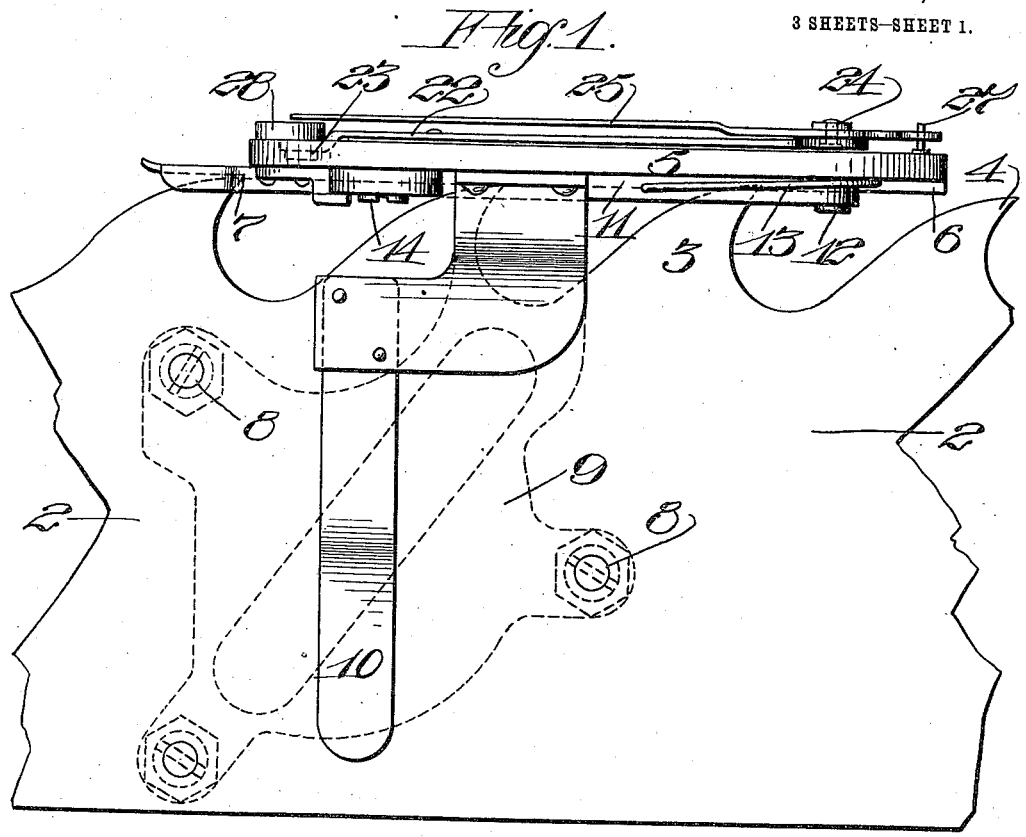
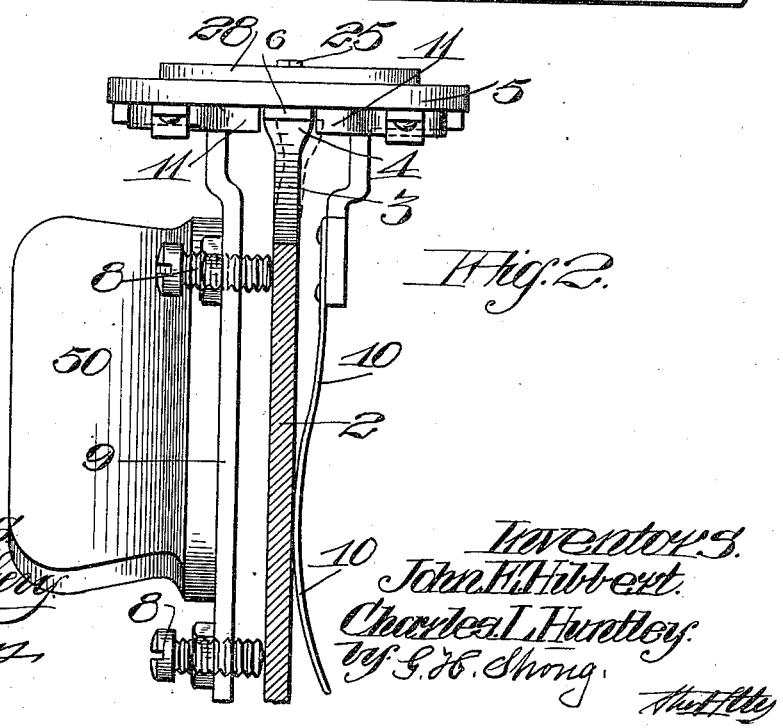

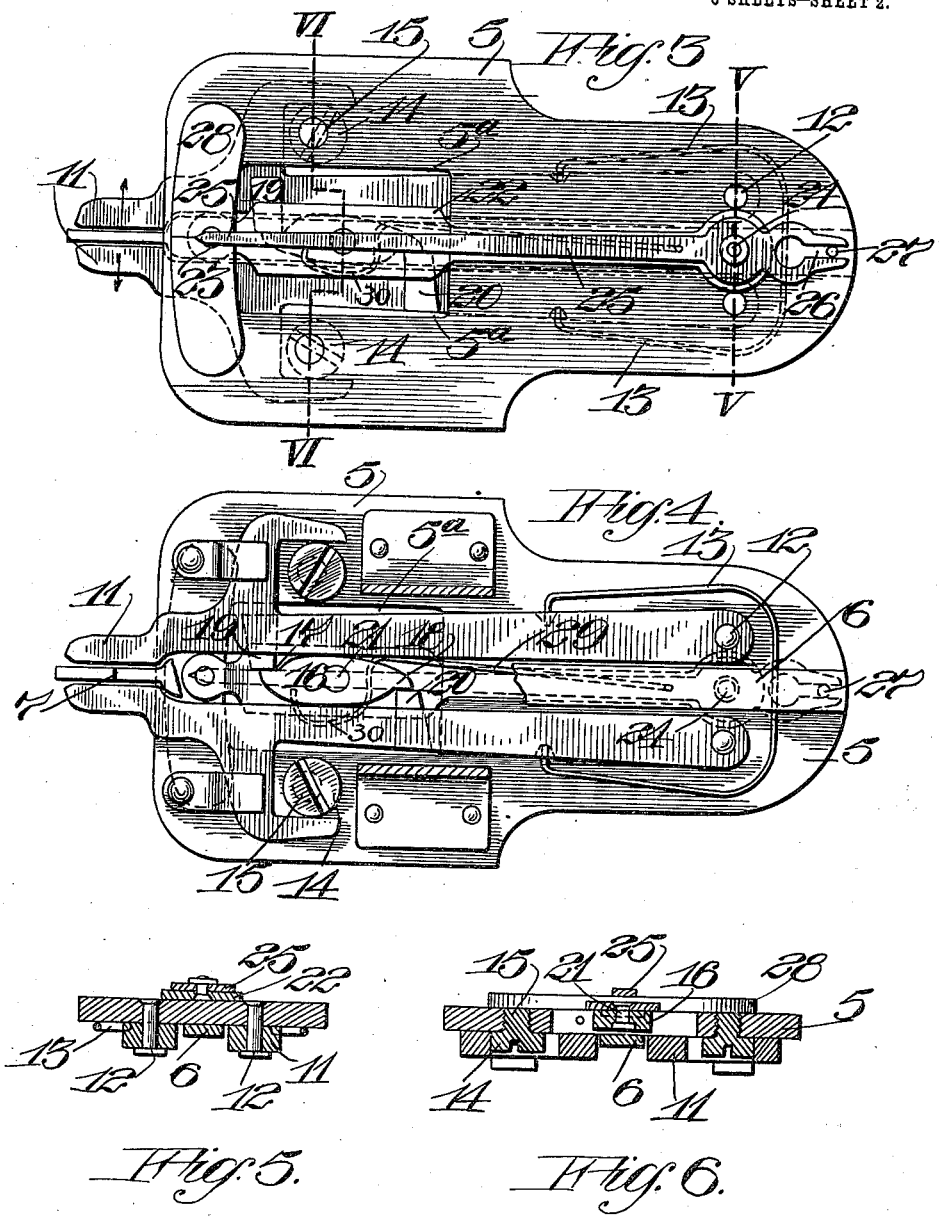

J. E. HIBBERT & C. L. HUNTLEY.
SAW TOOTH CENTERING INDICATOR.
APPLICATION FILED FEB. 20, 1912.

1,044,784.

Patented Nov. 19, 1912.

3 SHEETS—SHEET 3.

Witnesses:
Thos. Eastley
A. S. Berry

Inventors:
John E. Hibbert
Charles L. Huntley
by G. H. Strong
Attorney

UNITED STATES PATENT OFFICE.

JOHN E. HIBBERT AND CHARLES L. HUNTLEY, OF STIRLING CITY, CALIFORNIA.

SAW-TOOTH-CENTERING INDICATOR.

1,044,784. Specification of Letters Patent. Patented Nov. 19, 1912.

Application filed February 20, 1912. Serial No. 678,872.

*To all whom it may concern:*

Be it known that we, JOHN E. HIBBERT and CHARLES L. HUNTLEY, both citizens of the United States, residing at Stirling City, in the county of Butte and State of California, have invented new and useful Improvements in Saw-Tooth-Centering Indicators, of which the following is a specification.

This invention relates to saw gages and particularly to means for indicating and truing teeth which are out of center.

A saw is said to be out of "balance" when teeth are out of center on the same side; that is, the centers of the cutting edges of teeth are out of line with the center of the saw. This causes the saw to vibrate from side to side, making rough lumber, taking more power to run it, shortening the life of the saw, and diminishing the output. There are many causes that operate to shift the centers of teeth, among which are irregular grinding, unequal wear on corners of teeth, corners knocked off by gravel, etc., embedded in logs, crumbling of corners in swaging, etc.

The invention consists of the parts and the construction and combination of parts as hereinafter more fully described and claimed, having reference to the accompanying drawings, in which—

Figure 8:
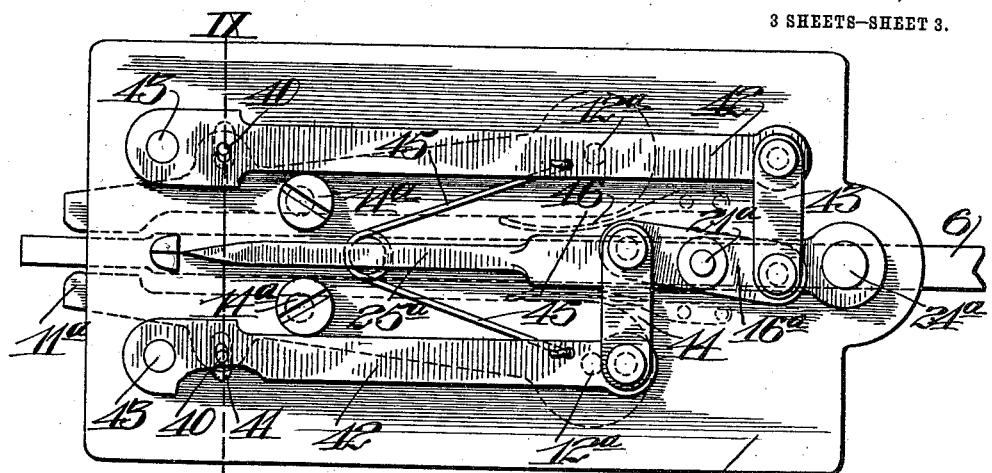
Figure 7:
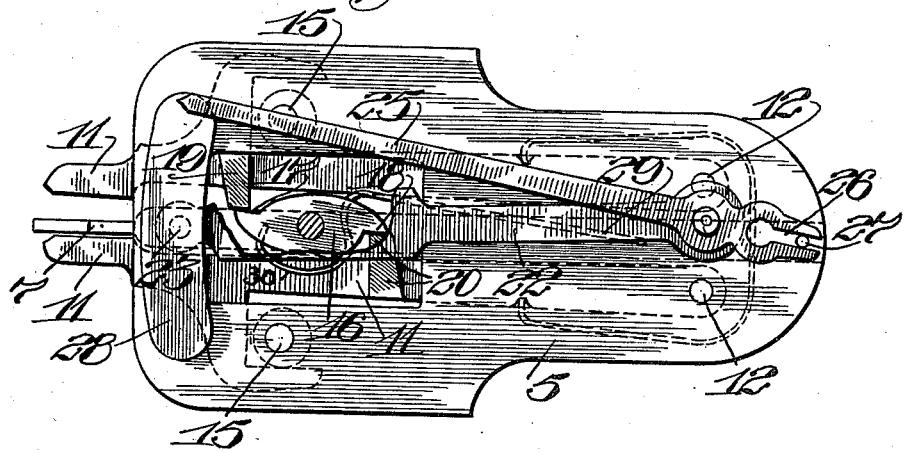
Figure 9:
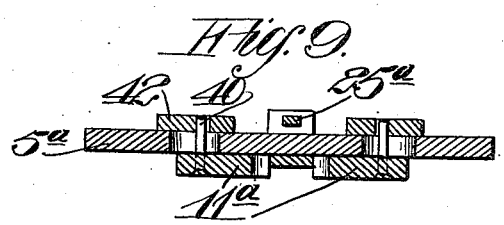

Figure 1 is a side elevation of the tool as applied. Fig. 2 is an end view of same. Fig. 3 is a top plan view. Fig. 4 is a bottom plan view partly in section. Fig. 5 is a cross-section on line V—V, Fig. 3. Fig. 6 is a cross-section on line VI—VI, Fig. 3. Fig. 7 is a top plan of the gage in indicating position. Fig. 8 is a top plan of a modified form of the device. Fig. 9 is a cross-section on line IX—IX, Fig. 8.

In Figs. 1 and 2 is shown a fragment of a saw 2, having teeth 3 with broad points 4 formed by swaging or other process. If the points 4 are sprung to one or the other side of the blade 2, a very rough-surfaced kerf is produced and this also occurs when any of the points are of greater than the average or gage width. To the end of keeping saws balanced and with teeth properly centered, we provide a tool readily adjustable to a large range of saws and by which an operator may easily find and then straighten or mark unbalanced teeth. The tool comprises a main plate or body 5 of substantial proportions and design and extending centrally and lengthwise of the plate on its lower surface is a rib 6 termed hereinafter the "rider", which is of sufficient length to reach over and rest upon one or more saw points 4. One end of the rider 6 is slightly recessed to form a stop or shoulder 7, against which may be abutted any tooth in the saw being tested. The tool is adjusted on a saw with the rider resting upon the teeth points, and is automatically positioned and held by a plurality of set-screws 8 turnable in a bracket 9 depending from one side of the gage plate 5. The screws 8 are so arranged that certain of them are substantially in a line with the recessed end of the rider and are adapted to be so adjusted against the side of the saw as to bring the rider centrally over the points 4, and then the screw 8 farthest from the operator is set to press on the saw and prevent the tool rocking on the front screws. The screws 8 are held in contact with the saw by means of a spring 10 attached to the opposite side of the plate 5 and springing toward the saw, thus drawing the screws in contact with the opposite side thereof. When the screws 8 are arranged in a triangle, forming a three-point bearing, as shown in Figs. 1 and 2, and the spring 10 is made to bear on the saw at substantially the geometric center of the triangle, a most effective and accurate positioning of the tool is obtained.

When the device has been adjusted on a saw and a relative movement longitudinally occurs, so that the teeth will pass successively along the rider 6, any over-sized or unbalanced teeth will act upon one or another or both of a pair of similar swinging jaws 11, the front ends of which are in juxtaposition with the abutment or stop end of the rider 6; the rear end of the jaws being pivoted at 12 on the lower side of plate 5. The jaws are automatically swung toward each other by spring arms 13, and the approaches of the jaws are limited by eccentrics 14 or other means attached to the plate and adjustable about screws 15. By means of the eccentrics 14, against which the jaws are pressed by their spring arms 13, the jaws may be spaced to gage saws of different size. When testing any given saw, the operative faces of the jaws are allowed by the eccentrics to approach, to form a space somewhat less than the gage width of a swaged tooth point 4. As a tooth which is side-sprung passes along the rider 6 and enters the jaws 11, which lie close to the lower surface of the plate 5, that jaw toward which the tooth is bent will be spread or moved outward away from its eccentric 14. The plate 5 is provided with an aperture 5ª and in the plane of the plate and in the aperture is a lever or follower 16, the ends 17—18 of which abut shoulders 19—20 on the jaws 11; the lever being fulcrumed at 21 on a beam or actuator 22 which is pivoted at 23 on the center line, and near the front, of the plate 5. The actuator 22 projects to the opposite end of plate 5 and has a pin 24, on which is movable a pointer 25, the short end of which is slotted at 26 to slide on a projection 27 fixed in the center line of the plate. This system of compound levers, as jaws 11, follower 16 engageable therewith, the actuator 22, and the pointer 25 connected to the actuator, all coöperate to multiply the movement derived by the pointer from the operation of one of the jaws 11 by an untrue tooth. This increment of movement enables the use of an easily read, graduated dial, over which the free end of the pointer may move, as at 28.

For the purpose of taking up all slack or lost motion in the train of levers and for the further office of actuating the single pointer by either of the jaws 11, the equalizer or floating follower 16 is so designed and operative that it is normally forced into contact with the diagonally opposite shoulders 19—20 of the jaws 11. The follower is subjected to pressure of a spring device, part of which, as 29, is effective to swing the end 18 of follower 16 against shoulder 20; and part of which is operative to swing the follower end 17 against the adjacent shoulder 19 of a jaw 11. The office of the spring device 29—30 is to cause the follower to follow either of the shoulders 19—20 which may move, due to the pressure of an untrue tooth on a jaw 11. If shoulder 19 moves outward, then the spring element 30 comes into action to press over the follower end 17, while follower end 18 is supported against swinging movement by the unmoved jaw shoulder 20. Now, since the follower is pivoted on actuator 22, as the follower is angularly shifted by the separation of the shoulders 19—20, its pivot 21 on beam 22 will move away from the center line of plate 5 (Fig. 7), thus causing the actuator 22 to swing on its pivot 23 and in turn actuate the pointer 25 by carrying its pivot 24 off the center line of plate 5. The movement of the pin 24 and its carrier 22 will be greatly multiplied in the pointer 25, the short end of which is restrained by the stationary lug 27. The side movement of pivot 24 will result in amplifying the motion of the pointer over the scale 28, so much so that a very small lateral movement of a calipering jaw 11 will be indicated by a much greater movement of pointer 25 and observed readily by the operator, who may then either mark the defective tooth or apply a tool to straighten it up. As stated, the spring device 29—30 is effective to constantly force the follower ends 17—18 into engagement with the shoulders 19—20 of the opposite jaws, 11—11, and when one or the other of supports 19—20 are moved, then the follower will swing on the opposite idle support and pressure of the spring device is sufficient to swing the actuator 22, by means of the pivot 21, and also the pointer 25.

Figs. 8 and 9 show a slightly modified form of the compounding levers. In this form the jaws 11ª are pivoted at 12ª to the plate 5ª. The jaws have lugs 40 which project up through openings 41 in the plate and are thrust up against the levers 42 on the upper surface of plate 5ª. The levers 42 are pivoted at 43 adjacent the free ends of jaws 11ª and the swinging ends of levers 42 are connected to opposite ends of an equalizer or follower 16ª by links 43—44. The follower 16ª is pivoted at 21ª on pointer 25ª, this being pivoted at 24ª on the top of plate 5ª beyond the ends of levers 42. To take up lost motion of the levers 42, a master spring 45 is effective to draw each against the adjustable stops 14ª and looseness of the jaws 11ª is obviated by light springs 46—46, which thrust the jaws outward until stopped by the levers 42; these being yieldably held by the spring 45 against the eccentrics 14ª.

The action of the modified form of the gage is as follows: When an unbalanced tooth moves between the jaws, one of these will spread and its lug or pin 40 will swing the associated lever 42 about its pivot 43. The swinging end of the actuated lever will pull on its link, as 44, and this will in turn swing the follower and pointer in the direction of its own movement. The slight movement of a jaw 11ª will be transmitted and compounded by the levers so that the pointer will clearly show the side toward which and how much a tooth is sprung.

The device is illustrated on a somewhat larger scale than the gages which have been actually used, but that is immaterial. Preferably it is in the form of a simple hand tool, with a hand hold 50 by which the operator can handle it and run it along the teeth of the saw, when sharpening or truing up the saw.

The device, while particularly for use in testing or gaging the teeth of band saws in lumber mills, is equally applicable for gaging or indicating the unbalanced teeth of any saw.

Experience shows that when the pointer is on center line, the tooth gage is less than 1/1000 inch out of center, and when all the teeth on the saw are so, the saw will be "balanced" and run true, regardless of variation in width of teeth; and if oversized teeth occur, the slight scratching caused by them will be divided between two surfaces on account of the teeth being centered.

Having thus described our invention, what we claim and desire to secure by Letters Patent is—

1. A saw gage consisting of a device to straddle the teeth of the saw to be gaged, said device comprising a pair of levers between the adjacent sides of which the saw is contained and an indicator connected to the levers and movable through the medium of the unbalanced teeth.

2. The combination with a saw, of a gage fitting the saw and having an indicator, and means comprising a pair of spaced levers between the adjacent sides of which the saw is contained and by which the indicator is moved in one direction or the other proportionally to the amount of lateral offset of the teeth when the device is moved along the saw.

3. The combination in a gage, of a pair of opposed swinging jaws, flexible means for supporting the jaws in spaced relation, an actuator between and engaging said jaws, and a pointer operative by either of said jaws.

4. A tool for indicating lateral offset in saw-teeth, comprising a pair of yieldable jaws adapted to close upon the side of a saw-tooth, a support for the jaws, a pointer mounted on the support, and means connecting the jaws and said pointer whereby movement of one or the other of the jaws is amplified in the pointer.

5. A tool for indicating offset saw-teeth comprising resiliently supported, independently movable jaws, adapted to close against the sides of the teeth, a carrier adjustable on the saw and having a surface slidable over the teeth points, said jaws being supported on the carrier and in spaced relation, means for alining the carrier on the saw, and mechanism for indicating and amplifying movement of either jaw.

6. A device for detecting the unbalanced teeth of a saw, comprising a body having a surface adapted to ride on the transverse edges of the teeth, a pair of jaws pivotally mounted on the body and arranged in spaced relation and between which the saw is confined, means for alining the riding surface with the saw, and means operative by the jaws and sensitive to and indicating unbalanced saw-teeth.

7. A device for detecting the unbalanced teeth of a saw, comprising a body having a surface adapted to ride on the transverse edges of the teeth, a pair of jaws pivotally mounted on the body and arranged in spaced relation and between which the saw is confined, means for alining the riding surface with the saw, means operative by the jaws and sensitive to and indicating unbalanced saw-teeth, and means for adjusting the tool to saws of different thickness.

8. A device for detecting laterally sprung teeth in a saw, comprising a rider, means for alining the rider with the saw, jaws arranged in spaced relation on the rider and capable of independent movement toward and from the rider and engageable with the sides of the saw-teeth, and means for indicating and amplifying movement of either jaw.

9. A device for detecting laterally sprung teeth in a saw, comprising a rider, means for alining the rider with the saw, jaws arranged in spaced relation on the rider and capable of independent movement toward and from the rider, and engageable with the sides of the saw-teeth, and means for indicating and amplifying movement of either jaw, and members for adjusting the jaws to operate on saws of different thicknesses.

In testimony whereof we have hereunto set our hands in the presence of two subscribing witnesses.

JOHN E. HIBBERT.
CHARLES L. HUNTLEY.

Witnesses:
IRVING H. HIBBERT,
CHESTER H. STOREY.